US011019008B2

(12) United States Patent
Yuan et al.

(10) Patent No.: US 11,019,008 B2
(45) Date of Patent: May 25, 2021

(54) METHOD, PUBLIC ACCOUNT SERVER, AND MOBILE TERMINAL FOR SENDING AND GENERATING CARDS

(71) Applicant: BANMA ZHIXING NETWORK (HONGKONG) CO., LIMITED, Kowloon (HK)

(72) Inventors: Zhijun Yuan, Beijing (CN); Jiadi Pei, Beijing (CN)

(73) Assignee: BANMA ZHIXING NETWORK (HONGKONG) CO., LIMITED, Kowloon (HK)

( * ) Notice: Subject to any disclaimer, the term of this patent is extended or adjusted under 35 U.S.C. 154(b) by 0 days.

(21) Appl. No.: 16/660,534

(22) Filed: Oct. 22, 2019

(65) Prior Publication Data

US 2020/0053033 A1 Feb. 13, 2020

Related U.S. Application Data

(63) Continuation of application No. 15/304,937, filed as application No. PCT/CN2015/076656 on Apr. 15, 2015, now Pat. No. 10,462,083.

(30) Foreign Application Priority Data

Apr. 18, 2014 (CN) .......................... 201410158328.6

(51) Int. Cl.
*G06F 15/16* (2006.01)
*H04L 12/58* (2006.01)
(Continued)

(52) U.S. Cl.
CPC .............. *H04L 51/08* (2013.01); *H04L 51/38* (2013.01); *H04L 67/02* (2013.01); *H04W 4/12* (2013.01);
(Continued)

(58) Field of Classification Search
CPC ..................................................... G06Q 20/351
(Continued)

(56) References Cited

U.S. PATENT DOCUMENTS 9,299,087 B1 3/2016 Barnes et al.
2007/0232399 A1* 10/2007 Kathman ................ A63F 13/12
463/42
(Continued)

FOREIGN PATENT DOCUMENTS

| CN | 1916945 A | 2/2007 |
| CN | 101339639 A | 1/2009 |

(Continued)

OTHER PUBLICATIONS

First Chinese Office Action issued in Chinese Application No. 201410158328.6, dated Nov. 8, 2017 (14 pages).
(Continued)

*Primary Examiner* — Hamza N Algibhah
(74) *Attorney, Agent, or Firm* — Finnegan, Henderson, Farabow, Garrett & Dunner, LLP

(57) ABSTRACT

A method, a public account server, and a mobile terminal for sending and generating a card are disclosed. The method includes: acquiring user information and card information of the mobile terminal; generating card data for the mobile terminal by using a preset card data model according to the user information and the card information of the mobile terminal; and sending the card data to the mobile terminal, so that the mobile terminal receives the card data, acquires a card template corresponding to the card data, and generates the card by using the card data and the card template.

15 Claims, 5 Drawing Sheets

(51) Int. Cl.
  *H04W 4/12* (2009.01)
  *H04W 4/21* (2018.01)
  *H04W 88/02* (2009.01)
  *H04L 29/08* (2006.01)
  *H04W 8/18* (2009.01)
  *H04M 1/72403* (2021.01)
  *H04L 29/06* (2006.01)

(52) U.S. Cl.
  CPC ............... *H04W 4/21* (2018.02); *H04W 8/18* (2013.01); *H04W 88/02* (2013.01); *H04L 67/42* (2013.01); *H04M 1/72403* (2021.01)

(58) Field of Classification Search
  USPC ........................................................ 709/206
  See application file for complete search history.

(56) References Cited

U.S. PATENT DOCUMENTS

| | | | | |
|---|---|---|---|---|
| 2009/0008445 | A1* | 1/2009 | Chen | G06Q 30/02 |
| | | | | 235/380 |
| 2009/0061884 | A1* | 3/2009 | Rajan | G06Q 30/0225 |
| | | | | 455/445 |
| 2010/0280921 | A1* | 11/2010 | Stone | G06Q 30/0603 |
| | | | | 705/27.1 |
| 2012/0118976 | A1 | 5/2012 | Debski | |
| 2013/0144733 | A1* | 6/2013 | Rothschild | G06Q 20/0457 |
| | | | | 705/17 |
| 2013/0159445 | A1* | 6/2013 | Zonka | G06Q 10/1093 |
| | | | | 709/206 |
| 2014/0355883 | A1 | 12/2014 | Li et al. | |
| 2014/0372187 | A1 | 12/2014 | Vaysman | |
| 2015/0161382 | A1* | 6/2015 | Boivie | G06F 21/53 |
| | | | | 726/28 |
| 2015/0363807 | A1 | 12/2015 | Katz et al. | |
| 2015/0379552 | A1* | 12/2015 | Kent | G06Q 20/3276 |
| | | | | 705/14.38 |
| 2016/0027033 | A1 | 1/2016 | Lobmaier | |
| 2016/0034992 | A1 | 2/2016 | Jaramillo | |
| 2016/0044484 | A1 | 2/2016 | Cho et al. | |
| 2016/0093008 | A1* | 3/2016 | Topko | G06Q 30/06 |
| | | | | 705/316 |
| 2016/0323723 | A1 | 11/2016 | Johnston et al. | |

FOREIGN PATENT DOCUMENTS

| | | |
|---|---|---|
| CN | 101860814 A | 10/2010 |
| CN | 102610012 A | 7/2012 |
| CN | 103338320 A | 10/2013 |
| CN | 103348368 A | 10/2013 |
| CN | 103475571 A | 12/2013 |
| KR | 10-2016-0101434 A | 8/2016 |
| KR | 10-2016-0104511 A | 9/2016 |
| WO | WO 2015/137490 A1 | 9/2015 |
| WO | WO 2015/158262 A1 | 10/2015 |
| WO | WO 2016/003511 A1 | 1/2016 |

OTHER PUBLICATIONS

First Chinese Search Report issued in Chinese Application No. 201410158328.6, dated Oct. 19, 2017, (1 page).
PCT International Search Report dated Jul. 10, 2015, issued in corresponding International Application No. PCT/CN2015/076656 (8 pages).
PCT Written Opinion dated Jul. 10, 2015, issued in corresponding International Application No. PCT/CN2015/076656 (9 pages).
Second Chinese Office Action issued in Chinese Application No. 201410158328.6, dated Jun. 11, 2018 (18 pages).

* cited by examiner

METHOD, PUBLIC ACCOUNT SERVER, AND MOBILE TERMINAL FOR SENDING AND GENERATING CARDS

CROSS REFERENCE TO RELATED APPLICATION

This application is a continuation of Ser. No. 15/304,937, filed Oct. 18, 2016, which is a U.S. national stage application under 35 U.S.C. § 371 of International Application No. PCT/CN2015/076656, filed on Apr. 15, 2015, which claims priority to and the benefits of priority to Chinese Application No. CN 201410158328.6, filed on Apr. 18, 2014. The contents of the aforementioned applications are incorporated herein by reference in their entireties.

TECHNICAL FIELD

The present disclosure relates to the field of communication technologies, specifically to a method, a public account server, and a mobile terminal for sending and generating a card.

BACKGROUND

Along with the development of communication technologies, mobile terminals such as mobile phones have increasingly powerful functions. The mobile terminals can be used not only to make phone calls and send short messages, but also to purchase products and the like. For existing service providers that provide purchasing services for mobile terminals, there is a need to send various cards, such as discount coupons, membership cards and cinema tickets, to the mobile terminals.

Currently, the method of sending cards to the mobile terminals is: sending card messages to the mobile terminals automatically or manually by using a public account of the service provider, such as a public account of a service provider on Laiwang, AliPay, WeChat or the like.

However, in the existing method of sending cards to the mobile terminals, the sent card message is merely a simple information type message, and cannot form a card that facilitates future use of a user.

SUMMARY

The disclosure seeks to resolve a technical problem of providing a method, a public account server, and a mobile terminal for sending and generating cards. Based on user information and card information of the mobile terminal, card data is generated for the mobile terminal by a preset card data model. The card data is sent to the mobile terminal, so that the mobile terminal receives the card data, and acquires a card template corresponding to the card data, and generates the card by using the card data and the card template. Virtual cards may be sent to the mobile terminal, facilitating a user to view and use in the future.

In order to resolve the above-mentioned problem, the disclosure provides a method for sending a card to a mobile terminal, the method comprising:

acquiring user information and card information of the mobile terminal;

generating card data for the mobile terminal by using a preset card data model according to the user information and the card information of the mobile terminal; and sending the card data to the mobile terminal, so that the mobile terminal receives the card data, acquires a card template corresponding to the card data, and generates the card by using the card data and the card template.

Further, the acquiring the user information and the card information of the mobile terminal comprises:

receiving a card generating request message sent by the mobile terminal, wherein the card generating request message carries the user information and the card information of the mobile terminal; and parsing the card generating request message by using a message engine, so as to obtain the user information and the card information of the mobile terminal.

Further, the acquiring the user information of the mobile terminal and the card information comprises:

receiving a card generating request message sent by a service provider, wherein the card generating request message comprises the user information and the card information of the mobile terminal; and parsing the card generating request message by using a message engine, so as to obtain the user information and the card information of the mobile terminal.

Further, the sending the card data to the mobile terminal comprises:

sending the card data to the mobile terminal through a message passage established between local and the mobile terminal.

Further, the user information comprises at least one of a user name, a user mobile terminal number, and a level of the user in the service provider of the card, and the card information comprises at least one of the service provider of the card and a type of the card.

In order to resolve the above-mentioned problem, the disclosure further provides a method for generating a card, the method comprising:

receiving card data, wherein the card data is generated by a public account server by using a preset card data model according to user information and card information of a mobile terminal;

acquiring a card template corresponding to the card data; and generating the card by using the card data and the card template.

Further, the acquiring a card template corresponding to the card data comprises:

searching for the card information corresponding to the card data;

sending card template request information carrying the card information to a card server, so that after the card template request information is received by the card server, the card server searches for a card template corresponding to the card information, and sends the card template corresponding to the card information to local; and receiving the card template corresponding to the card information sent by the card server.

Further, the generating the card by using the card data and the card template comprises:

combining the card data and the card template, so as to obtain a hypertext markup language HTML5 code of the card; and drawing the card in a Web environment according to the HTML5 code of the card.

Further, the card template is implemented by using HTML+CSS codes.

Further, after generating the card by using the card data and the card template, the method further comprises:

storing the card data according to a preset card provider format; and sharing the card data stored in the card provider format to a designated application.

Further, the preset card provider format is ContentResolver.insert(insertUri, values), wherein the "values" corresponds to the card data, the "insertUri" corresponds to an address of the card data.

In order to resolve the above-mentioned problem, the disclosure provides a public account server, the public account server comprising:

a first acquiring module, configured to acquire user information and card information of a mobile terminal;

a first generating module, configured to generate card data for the mobile terminal by using a preset card data model according to the user information and the card information of the mobile terminal; and a sending module, configured to send the card data to the mobile terminal, so that the mobile terminal receives the card data, acquires a card template corresponding to the card data, and generates the card by using the card data and the card template.

Further, the first acquiring module comprises:

a first receiving unit, configured to receive a card generating request message sent by the mobile terminal, wherein the card generating request message carries the user information and the card information of the mobile terminal; and a first parsing unit, configured to parse the card generating request message by a message engine, so as to obtain the user information and the card information of the mobile terminal.

Further, the first acquiring unit comprises:

a second receiving unit, configured to receive the card generating request message sent by a service provider, wherein the card generating request message comprises the user information and the card information of the mobile terminal; and a second parsing unit, configured to parse the card generating request message by a message engine, so as to obtain the user information and the card information of the mobile terminal.

Further, the sending module comprises:

a first sending unit, configured to send the card data to the mobile terminal through a message passage established between local and the mobile terminal.

Further, the user information comprises at least one of a user name, a user mobile terminal number, and a level of the user in the service provider of the card, and the card information comprises at least one of the service provider of the card and a type of the card.

In order to resolve the above-mentioned problem, the disclosure further provides a mobile terminal, the mobile terminal comprising:

a receiving module, configured to receive card data, wherein the card data is generated by a public account server by using a preset card data model according to user information and card information of a mobile terminal;

a second acquiring module, configured to acquire a card template corresponding to the card data; and a second generating module, configured to generate the card by using the card data and the card template.

Further, the second acquiring module comprises:

a searching unit, configured to search for the card information corresponding to the card data;

a second sending unit, configured to send card template request information carrying the card information to a card server, so that after the card template request information is received by the card server, the card server searches for a card template corresponding to the card information and sends the card template corresponding to the card information to local; and a third receiving unit, configured to receive the card template corresponding to the card information sent by the card server.

Further, the second generating unit comprises:

a combining unit, configured to combine the card data and the card template, so as to obtain a hypertext markup language HTML5 code of the card; and a drawing unit, configured to draw the card in a Web environment according to the HTML5 code of the card.

Further, the card template is implemented by HTML+CSS codes.

Further, the mobile terminal further comprises:

a storing module, configured to store the card data according to a preset card provider format; and a sharing module, configured to share the card data stored in the card provider format to a designated application.

Further, the preset card provider format is ContentResolver.insert(insertUri, values), wherein the "values" corresponds to the card data, the "insertUri" corresponds to an address of the card data.

Compared with prior art, the disclosure may have the following technical effects:

Based on the user information and the card information of the mobile terminal, the card data is generated for the mobile terminal by the preset card data model. The card data is sent to the mobile terminal, so that the mobile terminal receives the card data, and acquires a card template corresponding to the card data, and generates the card by using the card data and the card template. Virtual cards may be sent to the mobile terminal, facilitating the user to view and use in the future. By means of the method of the disclosure, simple card messages may be converted to virtual cards in various forms, and the cards are intuitive and visual. The card data is stored according to a preset card provider format. The card data stored in the card provider format is shared to the designated application. It provides a unified system for sharing and circulating cards, so that the card data may be illustrated and used in other applications of the mobile terminal.

It should be noted that, any product of this disclosure may not achieve all the technical effects described above simultaneously.

BRIEF DESCRIPTION OF THE DRAWINGS

The accompanying drawings, which constitute a part of this specification, illustrate several embodiments and, together with the description, serve to further explain the disclosed principles.

DETAILED DESCRIPTION

Implementations of the disclosure will be described in details with reference to accompanying drawings and embodiments, to help with fully understanding of how to apply technical solutions to solve technical problems and achieve technical effects and implementation of the disclosure.

In a typical configuration, a computer device includes one or more Central Processing Units (CPUs), an input/output interface, a network interface, and a memory.

The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

DESCRIPTION OF EMBODIMENTS

Figure 1:
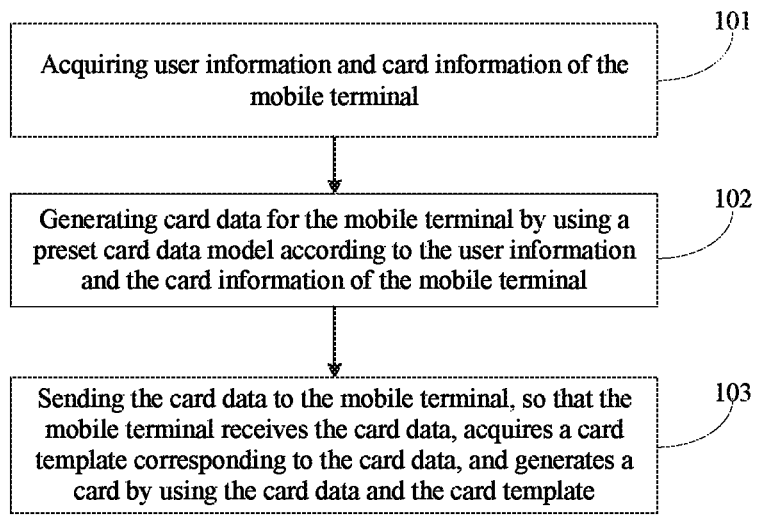
FIG. 1 is a flow chart of a method for sending a card to a mobile terminal according to embodiments of the disclosure.

The method of the disclosure will be further described based on an embodiment. As shown in FIG. 1, a flow chart of a method for sending a card to a mobile terminal provided by the embodiment of the disclosure is illustrated. The method may include:

S101: acquiring user information and card information of the mobile terminal.

In S101, the user information of the mobile terminal includes at least one piece of information such as a user name, a user mobile terminal number, a level of the user in the service provider (for example, the service provider is a bank, and the level of the user in the bank is a common user, and the like). The card information of the mobile terminal includes at least one piece of information, such as a service provider of a card and a type of the card.

For example, the acquiring the user information and the card information of the mobile terminal may include:

receiving a card generating request message sent by the mobile terminal, wherein the card generating request message carries the user information and the card information of the mobile terminal; and parsing the card generating request message by using a message engine, so as to obtain the user information and the card information of the mobile terminal.

Alternatively, for example, the acquiring the user information and card information of the mobile terminal may include:

receiving a card generating request message sent by a service provider, wherein the card generating request message carries the user information of and the card information the mobile terminal; and parsing the card generating request message by using a message engine, so as to obtain the user information and the card information of the mobile terminal.

That is, the acquisition of the user information and the card information of the mobile terminal may be from the mobile terminal or from the service provider. For example, a user may be informed, through a public account of a restaurant, that it is capable of getting a membership card of the restaurant. And if the user wants to acquire the membership card of the restaurant, the user may submit, through a mobile terminal, a card generating request message carrying user information and card information of the mobile terminal to a public account server. In another example, if a shopping mall intends to pre-release concessionary cards, the shopping mall may acquire, through a public account thereof on Laiwang, information of the users who follow the shopping mall, and then submit a card generating request message carrying the user information and the card information of the mobile terminal to the public account server.

For example, a format of the card generating request message may be a common text, an image-text, an audio message, a menu event, or the like. The format of the card generating request message is not limited herein.

S102: generating card data for the mobile terminal by using a preset card data model according to the user information and the card information of the mobile terminal.

Specifically, a card data engine may be generated based on the preset card data model and the card data is generated for the mobile terminal by the card data engine using the preset card data model based on the user information and the card information of the mobile terminal.

In the embodiment, the preset card data model is shown below:

```
{
    "card-id"//card identification
    "service-id"//service provider identification (also referred to
as an ISV (Internet Server Provider) identification)
    "ownerid"//card owner
    "title"//card title
    "content"//specific content of the card
    "occurtime"//card occur time (may be a start time of
using the card)
    "gmtexpired"//card expiration time (may be an end time
of using the card)
    "location"//card location (may be a place of using the card)
    "logourl"//card logo picture address
}
```

It should be noted that, the card data model is not limited to the above form, and may be set flexibly according to actual application situations. The card data model is not limited herein.

Moreover, it should be noted that the card data based on the card data model may be designed by using a format such as JSON (JavaScript Object Notation), HTML (Hypertext Markup Language), or the like.

S103: sending the card data to the mobile terminal, so that the mobile terminal receives the card data, acquires a card template corresponding to the card data, and generates a card by using the card data and the card template.

Specifically, the sending the card data to the mobile terminal may include:

sending the card data to the mobile terminal through a message passage established between local and the mobile terminal.

For example, the message passage is a channel that is used for sending and receiving message data and is established between the mobile terminal and the local (for example, the public account server).

In the method of sending the card to the mobile terminal according to the embodiment, the card data is generated for the mobile terminal by using the preset card data model according to the user information and the card information of the mobile terminal. The card data is sent to the mobile terminal, so that the mobile terminal receives the card data, acquires the card template corresponding to the card data, and generates the card by using the card data and the card template, so as to implement the capability of sending a virtual card to the mobile terminal, thereby facilitating the user to view and use in the future. By means of the method in the embodiment, simple card messages may be converted to virtual cards in various forms, and the cards are intuitive and visual.

Figure 2:
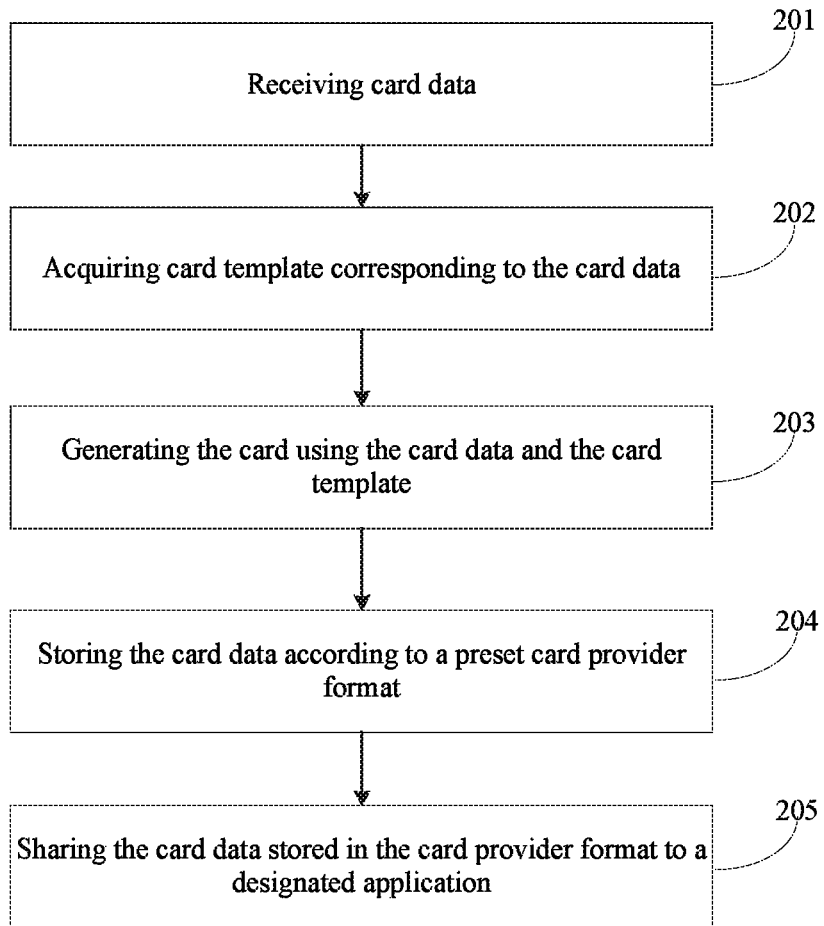
FIG. 2 is a flow chart of a method for generating a card according to the embodiments of the disclosure.

FIG. 2 shows a method of generating a card according to an embodiment of the disclosure. The method comprises:

S201: receiving card data.

For example, the card data is generated by a public account server using a preset card data model according to user information and card information of a mobile terminal. For example, the user information includes at least one of a user name, a user mobile terminal number, and a level of a user in a service provider of a card, and the card information includes at least one of a service provider of the card and a type of the card.

S202: acquiring card template corresponding to the card data.

For example, the acquiring the card template corresponding to the card data includes:

searching for card information corresponding to the card data;

sending card template request information carrying the card information to the card server, so that after the card template request information is received by the card server, the card server searches for the card template corresponding to the card information, and sends the card template corresponding to the card information to local; and receiving the card template corresponding to the card information sent by the server.

For example, the card server may be a server that is set independently, and may also be a service unit that is set in a public account server. The card server is not specifically limited herein. Moreover, the card template corresponding to the card information may be preset according to the service provider, the card type and the like in the card information, and the card template corresponding to the card information is stored in the card server, so that the card template may be acquired from the card server if needed.

S203: generating the card using the card data and the card template.

For example, the generating the card by using the card data and the card template includes:

combining the card data and the card template, so as to obtain a Hypertext Markup Language (HTML) 5 code of the card; and drawing the card in a Web environment according to the HTML5 code of the card.

For example, the card template may be implemented by using HTML+CSS (Cascading Style Sheet) codes.

Figure 3:
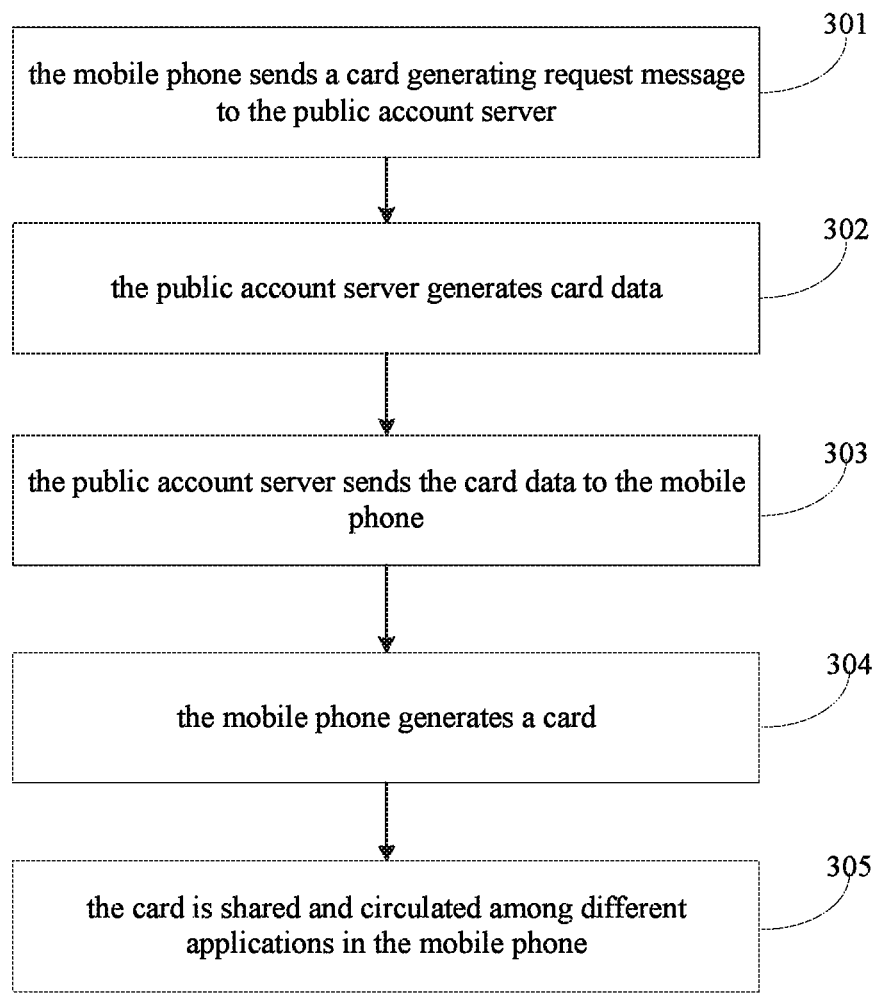
FIG. 3 is a flow chart of an application according to the embodiments of the disclosure.

For example, with reference to FIG. 3, after the generating the card by using the card data and the card template, the method further includes:

S204: storing the card data according to a preset card provider format.

The preset card provider format is: ContentResolver.insert (insertUri, values);

The "values" corresponds to the card data, and the "insertUri" corresponds to the address of the card data. For example, the "insertUri" is set to: content://com.yunos.lifecard/cards.

S205: sharing the card data stored in the card provider format to a designated application.

For example, the designated application may be one or more applications in the mobile terminal, and may also be all applications in the mobile terminal. According to actual application situations, some applications may be preset as the designated applications, or the user may select some applications as the designated applications upon using.

Specifically, by means of broadcasting, the card data stored in the card provider format is shared to the designated application. For example, a broadcast of the card is generated and defined as: com.yunos.lifecard.action.LIFECARD_ADDED, and all applications receiving this broadcast will receive a broadcast notification of adding the card, acquire the card data from a system provider, and then use the card data based on specific requirements of respective applications, so that the card data may be shared and circulated between the applications.

In the method of sending the card to the mobile terminal according to the embodiment, the card data is generated for the mobile terminal by using the preset card data model according to the user information and the card information of the mobile terminal. The card data is sent to the mobile terminal, so that the mobile terminal receives the card data, acquires the card template corresponding to the card data, and generates the card by using the card data and the card template, so as to implement the capability of sending a virtual card to the mobile terminal, thereby facilitating the user to view and use in the future. By means of the method in the embodiment, simple card messages may be converted to virtual cards in various forms, and the cards are intuitive and visual.

Figure 4:
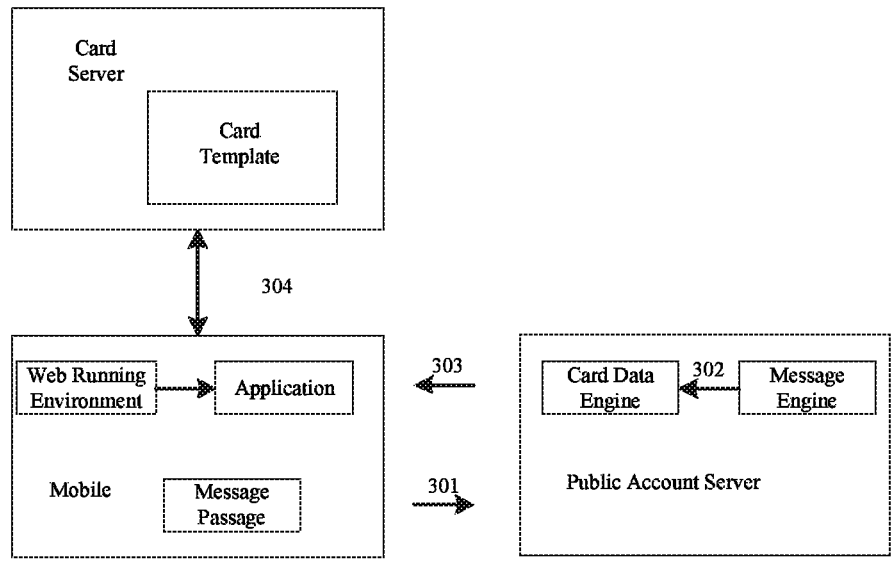
FIG. 4 is an illustrative diagram of a flow of an application according to the embodiments of the disclosure.

To facilitate understanding of the disclosure, the implementation of the disclosure is further illustrated by an example of using a mobile phone as the mobile terminal and using a specific application process of a mobile phone and a public account. With reference to FIG. 3 and FIG. 4, the application process includes:

S301: the mobile phone sends a card generating request message to the public account server.

A user sends the card generating request message to a public account by using the mobile phone, and the card generating request message carries user information and card information of the mobile phone. The format of the card generating request message may be a common text, an image-text, an audio message, a menu event, or the like.

S302: the public account server generates card data.

After the card generating request message of the mobile phone is received by the public account server, the public account server parses the card generating request message by using a message engine, so as to obtain the user information and the card information of the mobile phone. A card data engine of the public account server generates the card data for the mobile terminal by using a preset card data module based on the user information and the card information of the mobile phone.

S303: the public account server sends the card data to the mobile phone.

The public account server sends the card data generated in the previous step to the mobile phone based on a message passage established with the mobile phone.

S304: the mobile phone generates a card.

After the card data is received by the mobile phone, the mobile phone may request a card server for a corresponding card template based on the card data (bi-directional). The card template is HTML+CSS codes, defines a style of a card, and generates a card by rendering of a Web running environment in combination with the card data.

Figure 5:
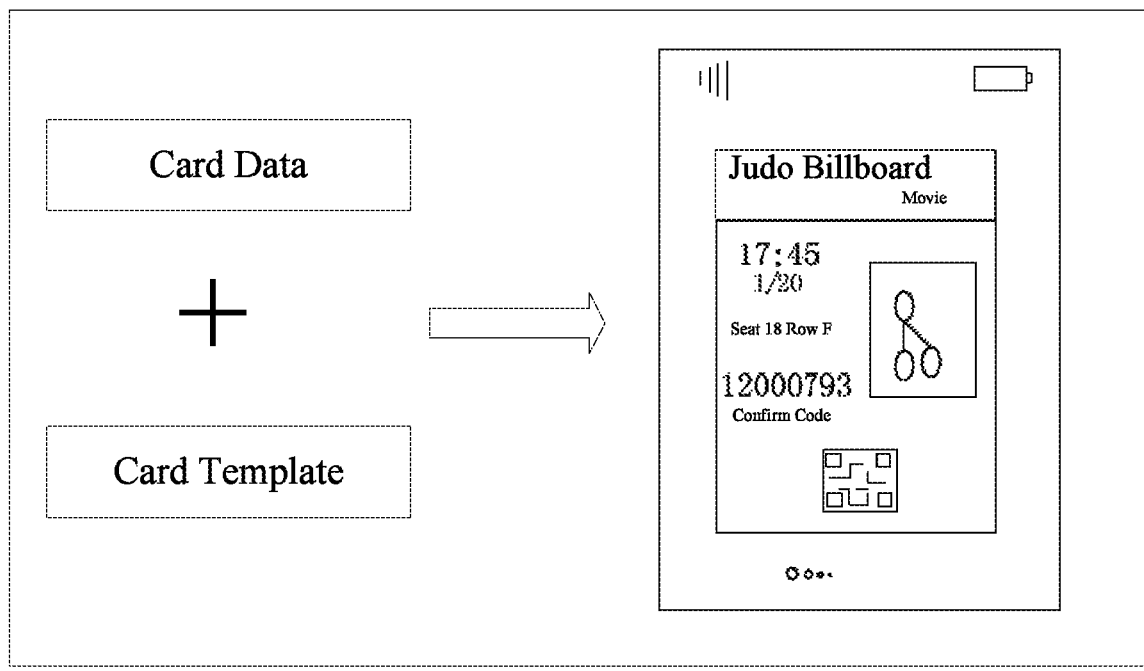
FIG. 5 is an illustrative diagram of generating a card according to the embodiments of the disclosure.

With reference to FIG. 5, a diagram of generating a card according to an embodiment of the disclosure is illustrated.

S305: the card is shared and circulated among different applications in the mobile phone.

After the card is generated by the mobile phone, the card data is stored according to a preset card provider, and shared to other applications in the mobile phone, so that the card is shared and circulated among different applications in the mobile phone.

In the method of generating the card according to the embodiment, the card data is generated for the mobile terminal by using the preset card data model according to the user information and the card information of the mobile terminal. The card data is sent to the mobile terminal, so that the mobile terminal receives the card data, acquires the card template corresponding to the card data, and generates the card by using the card data and the card template, so as to implement the capability of sending a virtual card to the mobile terminal, thereby facilitating the user to view and use in the future. By means of the method in the embodiment, simple card messages may be converted to virtual cards in various forms, and the cards are intuitive and visual. The card data is stored according to the preset card provider, and the card data stored according to the preset card provider is shared to designated applications. By providing a unified system for sharing and circulating the card, the card data may be illustrated and used in other applications in the mobile phone.

Figure 6:
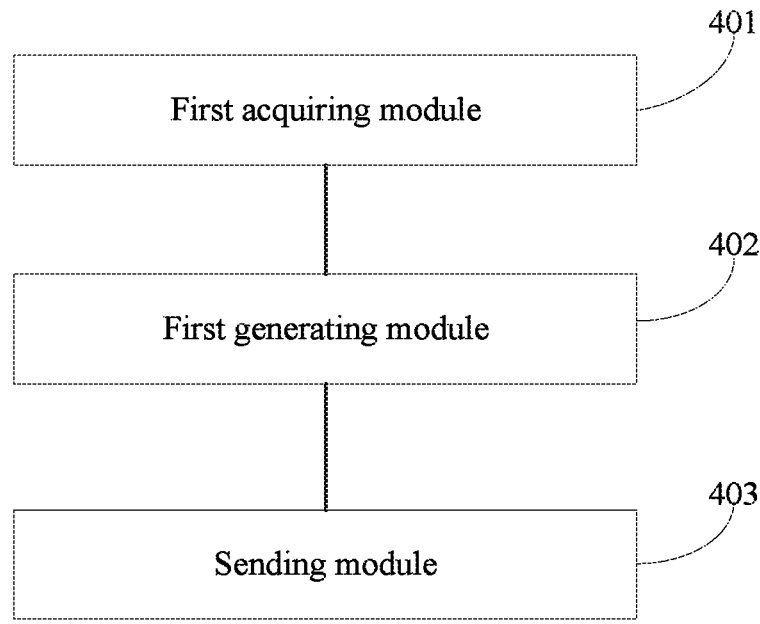
FIG. 6 is an illustrative structural diagram of a public account server according to the embodiments of the disclosure.

As shown in FIG. 6, a structural diagram of a public account server according to an embodiment of the disclosure is illustrated. The public account server includes:

a first acquiring module 401, configured to acquire user information and card information of a mobile terminal;

a first generating module 402, configured to generate card data for the mobile terminal by using a preset card data model according to the user information and the card information of the mobile terminal; and a sending module 403, configured to send the card data to the mobile terminal, so that the mobile terminal receives the card data, acquires a card template corresponding to the card data, and generates the card by using the card data and the card template.

Further, the first acquiring module 401 comprises:

a first receiving unit, configured to receive a card generating request message sent by the mobile terminal, wherein the card generating request message carries the user information and the card information of the mobile terminal; and a first parsing unit, configured to parse the card generating request message by a message engine, so as to obtain the user information and the card information of the mobile terminal.

Further, the first acquiring unit 401 comprises:

a second receiving unit, configured to receive the card generating request message sent by a service provider, wherein the card generating request message comprises the user information and the card information of the mobile terminal; and a second parsing unit, configured to parse the card generating request message by a message engine, so as to obtain the user information and the card information of the mobile terminal.

Further, the sending module 403 comprises:

a first sending unit, configured to send the card data to the mobile terminal through a message passage established between local and the mobile terminal.

Further, the user information comprises at least one of a user name, a user mobile terminal number, and a level of the user in the service provider of the card, and the card information comprises at least one of the service provider of the card and a type of the card.

In the public account server according to the embodiment, the card data is generated for the mobile terminal by using the preset card data model according to the user information and the card information of the mobile terminal. The card data is sent to the mobile terminal, so that the mobile terminal receives the card data, acquires the card template corresponding to the card data, and generates the card by using the card data and the card template, so as to implement the capability of sending a virtual card to the mobile terminal, thereby facilitating the user to view and use in the future. By means of method in the embodiment, simple card messages may be converted to virtual cards in various forms, and the cards are intuitive and visual.

Figure 7:
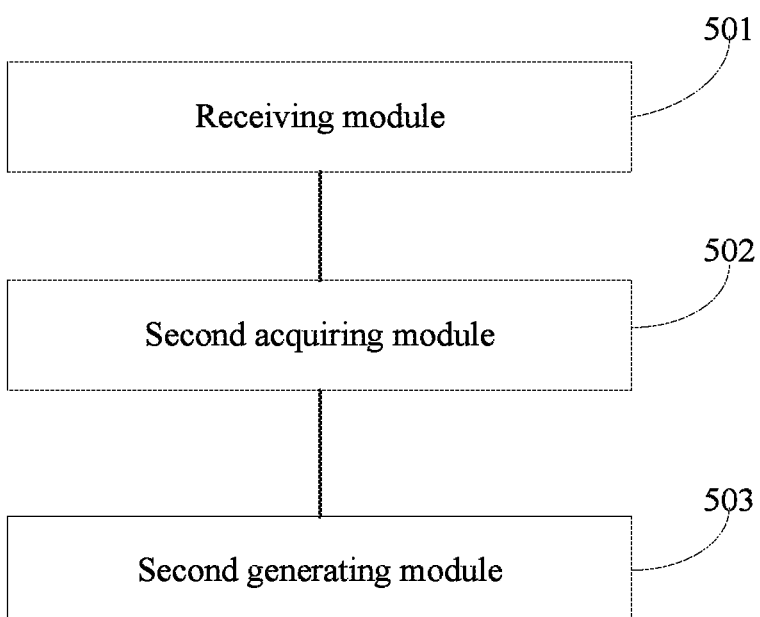
FIG. 7 is an illustrative structural diagram of a mobile terminal according to the embodiments of the disclosure.
Figure 8:
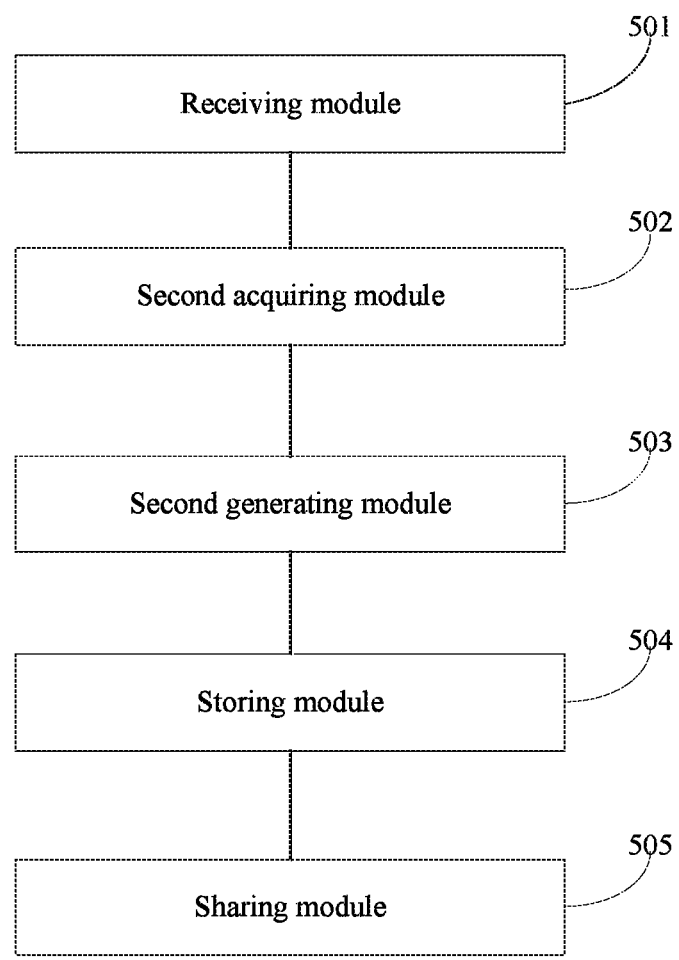
FIG. 8 is an illustrative structural diagram of another mobile terminal according to the embodiments of the disclosure.

As shown in FIG. 7, a structural diagram of a mobile terminal according to an embodiment of the disclosure is illustrated. The mobile terminal comprises:

a receiving module 501, configured to receive card data, wherein the card data is generated by a public account server by using a preset card data model according to user information and card information of a mobile terminal;

a second acquiring module 502, configured to acquire a card template corresponding to the card data; and a second generating module 503, configured to generate the card by using the card data and the card template.

Further, the second acquiring module 502 comprises:

a searching unit, configured to search for the card information corresponding to the card data;

a second sending unit, configured to send card template request information carrying the card information to a card server, so that after the card template request information is received by the card server, the card server searches for a card template corresponding to the card information and sends the card template corresponding to the card information to local; and a third receiving unit, configured to receive the card template corresponding to the card information sent by the card server.

Further, the second generating unit 503 comprises:

a combining unit, configured to combine the card data and the card template, so as to obtain a hypertext markup language (HTML) 5 code of the card; and a drawing unit, configured to draw the card in a Web environment according to the HTML5 code of the card.

Further, the card template is implemented by HTML+CSS codes.

Further, the mobile terminal further comprises:

a storing module 504, configured to store the card data according to a preset card provider format; and a sharing module 505, configured to share the card data stored in the card provider format to a designated application.

Further, the preset card provider format is ContentResolver.insert(insertUri, values), wherein the "values" corresponds to the card data, the "insertUri" corresponds to an address of the card data.

In the mobile terminal according to the embodiment, the card data is generated for the mobile terminal by using the preset card data model according to the user information and the card information of the mobile terminal. The card data is sent to the mobile terminal, so that the mobile terminal receives the card data, acquires the card template corresponding to the card data, and generates the card by using the card data and the card template, so as to implement the capability of sending a virtual card to the mobile terminal, thereby facilitating the user to view and use in the future. By means of method in the embodiment, simple card messages may be converted to virtual cards in various forms, and the cards are intuitive and visual. The card data is stored according to the preset card provider, and the card data stored according to the preset card provider is shared to designated applications. By providing a unified system for sharing and circulating the card, the card data may be illustrated and used in other applications in the mobile phone.

The public account server and the mobile terminal correspond to the method described above. If the public account server and the mobile terminal are not fully described, please refer to the description with respect to the above-mentioned methods and devices, the description of which is omitted herein.

The above descriptions illustrate and describe some embodiments of the disclosure. As stated above, it will be appreciated that the present invention is not limited to the forms that has been disclosed herein, and does not exclude other embodiments either. The embodiments may be applied to other combination, modification, and environment. And various modifications and changes may be made according to the above teachings and related technologies or knowledge, within the conceptive scope of the disclosure. The modifications and changes made by those skilled in the art are within the scope of the disclosure. It is intended that the scope of the invention should only be limited by the appended claims.

What is claimed is:

1. A method implemented by a server, the method comprising:
   receiving a card generating request message via a message channel;
   parsing the card generating request message by using a message engine, to determine user information and card information;
   generating card data by using a preset card data model according to the user information and the card information; and
   sending the card data to a mobile terminal via the message channel, wherein the card data is used by the mobile terminal to:
      acquire a card template corresponding to the card data,
      generate a virtual card by using the card template, and
      send, to one or more applications in the mobile terminal, a broadcast notification of sharing the virtual card.

2. The method according to claim 1, wherein the virtual card comprises a coupon.

3. The method according to claim 1, wherein the receiving the card generating request message comprises:
   receiving the card generating request message from the mobile terminal.

4. The method according to claim 1, wherein the receiving the card generating request message comprises:
   receiving the card generating request message from a service provider.

5. The method according to claim 1, wherein
   the user information comprises at least one of a user name, a user mobile terminal number, and a level of a user in a service provider of the card; and
   the card information comprises at least one of the service provider of the card and a type of the card.

6. A server, comprising:
   a memory storing instructions; and
   one or more processors configured to execute the instructions to cause the server to:
      receive a card generating request message via a message channel;
      parse the card generating request message by using a message engine, to determine user information and card information;
      generate card data for a mobile terminal by using a preset card data model according to the user information and the card information; and
      send the card data to the mobile terminal via the message channel,
      wherein the card data is used by the mobile terminal to:
         acquire a card template corresponding to the card data,
         generate a virtual card by using the card template, and
         send, to one or more applications in the mobile terminal, a broadcast notification of sharing the virtual card.

7. The server according to claim 6, wherein the virtual card comprises a coupon.

8. The server according to claim 6, wherein the one or more processors is further configured to execute the instructions to cause the server to:
   receive the card generating request message sent by the mobile terminal.

9. The server according to claim 6, wherein the one or more processors is further configured to execute the instructions to cause the server to:
   receive the card generating request message from a service provider.

10. The server according to claim 6, wherein:
    the user information comprises at least one of a user name, a user mobile terminal number, and a level of a user in a service provider of the card; and
    the card information comprises at least one of the service provider of the card and a type of the card.

11. A non-transitory computer readable medium that stores a set of instructions that is executable by at least one processor of a computer system to cause the computer system to perform a method comprising:

receiving a card generating request message via a message channel;

parsing the card generating request message by using a message engine, to determine user information and card information;

generating card data for a mobile terminal by using a preset card data model according to the user information and the card information; and sending the card data to the mobile terminal via the message channel, wherein the card data is used by the mobile terminal to: acquire a card template corresponding to the card data, generate a virtual card by using the card template, and send, to one or more applications in the mobile terminal, a broadcast notification of sharing the virtual card.

12. The non-transitory computer readable medium according to claim 11, wherein the virtual card comprises a coupon.

13. The non-transitory computer readable medium according to claim 11, wherein receiving the card generating request message comprises:

receiving the card generating request message from the mobile terminal.

14. The non-transitory computer readable medium according to claim 11, wherein receiving the card generating request message comprises:

receiving the card generating request message from a service provider.

15. The non-transitory computer readable medium according to claim 11, wherein:

the user information comprises at least one of a user name, a user mobile terminal number, and a level of a user in a service provider of the card; and the card information comprises at least one of the service provider of the card and a type of the card.

\* \* \* \* \*